United States Patent
Nagai et al.

(10) Patent No.: US 7,068,156 B2
(45) Date of Patent: Jun. 27, 2006

(54) CONNECTING CIRCUIT FOR LAMP MODULES

(75) Inventors: Kentaro Nagai, Shizuoka (JP); Haruyuki Matsushita, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 74 days.

(21) Appl. No.: 10/869,906

(22) Filed: Jun. 18, 2004

(65) Prior Publication Data

US 2004/0256914 A1    Dec. 23, 2004

(30) Foreign Application Priority Data

Jun. 20, 2003 (JP) .......................... P2003-176136

(51) Int. Cl.
*B60Q 1/00* (2006.01)

(52) U.S. Cl. .................. 340/438; 340/458; 340/459

(58) Field of Classification Search ................ 340/438, 340/439, 458, 459, 461, 462, 433; 307/10.1, 307/10.8, 38; 315/86

See application file for complete search history.

(56) References Cited

U.S. PATENT DOCUMENTS 3,913,066 A * 10/1975 Kehry et al. .......... 340/426.23
4,156,232 A * 5/1979 Blass ..................... 340/825.21
5,621,277 A * 4/1997 Ricca .......................... 315/86
5,760,490 A * 6/1998 Yanase ...................... 307/10.8
5,770,999 A * 6/1998 Rhodes ....................... 340/468

FOREIGN PATENT DOCUMENTS

| DE | 42 01 657 A1 | 10/1992 |
| DE | 42 19 029 C2 | 7/1997 |
| DE | 199 43 997 A1 | 3/2001 |
| EP | 0 755 825 B1 | 4/2000 |
| EP | 1 074 431 A2 | 2/2001 |

* cited by examiner

*Primary Examiner*—Van T. Trieu
(74) *Attorney, Agent, or Firm*—Sughrue Mion, PLLC

(57) ABSTRACT

In a circuit configuration provided in a vehicle, a first circuit is directly connected to an electric junction box to supply a notification signal indicating a condition of a part of the vehicle. A second circuit is adapted to transmit the notification signal. A first lamp module is disposed at a first part of the vehicle, and provided with a switch, and a junction circuit at which the first circuit and the second circuit are connected or disconnected in accordance with a state of the switch. A second lamp module is disposed at a second part of the vehicle and connected to the first lamp module via the second circuit. A light emitter which emits light when the notification signal is supplied thereto is provided in each of the first lamp module and the second lamp module.

8 Claims, 5 Drawing Sheets

CONNECTING CIRCUIT FOR LAMP MODULES

BACKGROUND OF THE INVENTION

The present invention is related to a connecting circuit for lamp modules for various sorts of lamps for illuminating, for example, the interiors of vehicles. Particularly, the present invention is related to a connecting circuit capable of canceling the cooperative illumination function.

Nowadays, a vehicle is provided with a map lamp on a front area of an interior ceiling thereof, a dome lamp at a center area of the interior ceiling, and a rear reading lamp on a rear area of the interior ceiling. The map lamp is used in such a case that a driver of the vehicle reads maps. The dome lamp is used when the entire interior is illuminated. The rear reading lamp is used in a case that a passenger of a rear seat reads magazines.

The respective lamps, more specifically, map lamps installed on the side of driver's seat emits light so as to notify such a condition that a door of the vehicle is opened and/or is not completely closed. In other words, the courtesy lamp of the door and the map lamp emit light in a cooperating manner.

However, when the map lamp emits light every time the door is opened/closed, some car drivers may have bother feelings. Under such a circumstance, a cancel switch is provided with a map lamp. In the case that this cancel switch is activated, this map lamp and a courtesy lamp are placed in a non-cooperating mode, so that the map lamp does not emit light every time a door is opened/closed. That is, this map lamp is used only for the purpose of the map lamp.

FIG. 5 shows a connecting circuit provided with such a configuration.

A junction box 41 is connected to a power supply circuit (indicated by symbol "B") connected with a battery, a signal circuit 47 connected with a courtesy lamp, and a grounding circuit (indicated by symbol "G") 48 connected with a ground. The signal circuit 47 is indicated by symbol "CTY", and will be referred to as a "courtesy circuit" or "notification signal circuit" hereinafter. The respective circuits 46 to 48 are connected via a junction connector 42 to a map lamp 43, a dome lamp 44, and a rear reading lamp 45 in a branching connection manner.

Two light emitters 49 are series-connected in the map lamp 43, a cancel switch 50 is arranged between the two light emitters 49, and this cancel switch 50 is slidable in the right/left directions in this figure so as to activate or deactivate a courtesy circuit 52. By sliding the switch 54 in the right side of this figure, the light emitter 49 is connected to the courtesy circuit 52 to validate the condition of the courtesy circuit 52. By sliding the switch 54 to the left side in this figure, the light emitter 49 is turned on irrespective of the condition of the switch 50 (the courtesy circuit 52).

In the dome lamp 44, one end of a light emitter 55 is connected to a power supply circuit 56, and the other end of the light emitter 55 is selectably connected to a courtesy circuit 57 or a grounding circuit 58 via a switch 59. By sliding the switch 59 in the right side of this figure, the light emitter 55 is connected to the courtesy circuit 57 to validate the condition of the courtesy circuit 52. By sliding the switch 59 to the left side in this figure, the light emitter 55 is turned on irrespective of the condition of the switch 50 (the courtesy circuit 52).

In the rear reading lamp 45, one end of a light emitter 60 is connected to a power supply circuit 61, and the other end of the light emitter 60 is selectably connected to a courtesy circuit 62 or a grounding circuit 63 via a switch 64. By sliding the switch 64 in the right side of this figure, the light emitter 60 is connected to the courtesy circuit 62 to validate the condition of the courtesy circuit 52. By sliding the switch 64 to the left side in this figure, the light emitter 60 is turned on irrespective of the condition of the switch 50 (the courtesy circuit 52).

As explained above, the cooperations between the respective lamps 43 to 45 and the respective courtesy circuits 52, 57, 62 can be canceled. The map lamp 43, the dome lamp 44, and the rear reading lamps 45 are constructed as lamp modules, respectively.

However, in the above configuration, since the circuits derived from the junction box 41 are wired via the junction connector 42 to the respective lamp modules 43 to 45, the following problems occur. That is, the circuit construction becomes huge and complex, is manufactured in high cost, and also, requires a large number of steps when these circuits are distributed to vehicles. Furthermore, a large number of circuit distribution spaces are required.

SUMMARY OF THE INVENTION

It is therefore an object of the invention to provide a simple circuit configuration for connecting lamp modules with the canceling function for the cooperative illumination.

In order to achieve the above object, according to the invention, there is provided a circuit configuration provided in a vehicle, comprising:
an electric junction box;
a first circuit, directly connected to the electric junction box to supply a notification signal indicating a condition of a part of the vehicle;
a second circuit, adapted to transmit the notification signal;
a first lamp module, disposed at a first part of the vehicle, comprising:
  a switch; and
  a junction circuit, at which the first circuit and the second circuit are connected or disconnected in accordance with a state of the switch; and
a second lamp module, disposed at a second part of the vehicle and connected to the first lamp module via the second circuit,
wherein a light emitter which emits light when the notification signal is supplied thereto is provided in each of the first lamp module and the second lamp module.

With such a configuration, since the junction circuit acts the same role as the conventional junction connector, the circuit construction can be made simple, and compact. The transmission of the notification signal supplied from the electric junction box to the second circuit can be interrupted by the switch. Here, the light emitters provided in the respective lamp modules are deactivated. Therefore, the lamp module connecting circuit can be easily and firmly installed in the narrow space of the vehicle with low costs.

Preferably, the circuit configuration further comprises a third lamp module, disposed at a third part of the vehicle and connected to the first lamp module via the second circuit. A light emitter which emits light when the notification signal is supplied thereto is provided in the third lamp module.

With such a configuration, all of the light emitters in the first, second and third lamp modules are deactivated by the operation of the switch. Here, the third lamp module may be series-connected to the first lamp module or the second lamp module.

Preferably, the circuit configuration further comprises a third lamp module, disposed at a third part of the vehicle and connected to the first lamp module via the first circuit. A light emitter which emits light when the notification signal is supplied thereto is provided in the third lamp module.

With such a configuration, the light emitters in the first and second lamp modules are deactivated by the operation of the switch. Here, the third lamp module may be series-connected to the first lamp module or the electric junction box.

According to the invention, there is also provided a circuit configuration provided in a vehicle, comprising:

an electric junction box;

a first circuit, directly connected to the electric junction box to supply a notification signal indicating a condition of a part of the vehicle;

a second circuit, adapted to transmit the notification signal;

a first lamp module, disposed at a first part of the vehicle, comprising:

a switch; and a junction circuit, at which the first circuit and the second circuit are connected or disconnected in accordance with a state of the switch; and a second lamp module, disposed at a second part of the vehicle and connected to the electric junction box via the first circuit, wherein a light emitter which emits light when the notification signal is supplied thereto is provided in each of the first lamp module and the second lamp module.

Preferably, the circuit configuration further comprises a third lamp module, disposed at a third part of the vehicle and connected to the electric junction box via the first circuit. A light emitter which emits light when the notification signal is supplied thereto is provided in the third lamp module.

With such a configuration, only the light emitter in the first lamp module is deactivated by the operation of the switch. Here, the third lamp module may be series-connected to the second lamp module or the electric junction box.

In the above cases, the first lamp module may be a map lamp module, one of the second lamp module and the third lamp module may be a dome lamp module, the other one of the second lamp module and the third lamp module may be a rear reading lamp module, and the notification signal may indicates whether a courtesy lamp is activated.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

Preferred embodiments of the invention will be described below in detail with reference to the accompanying drawings.

Figure 1:
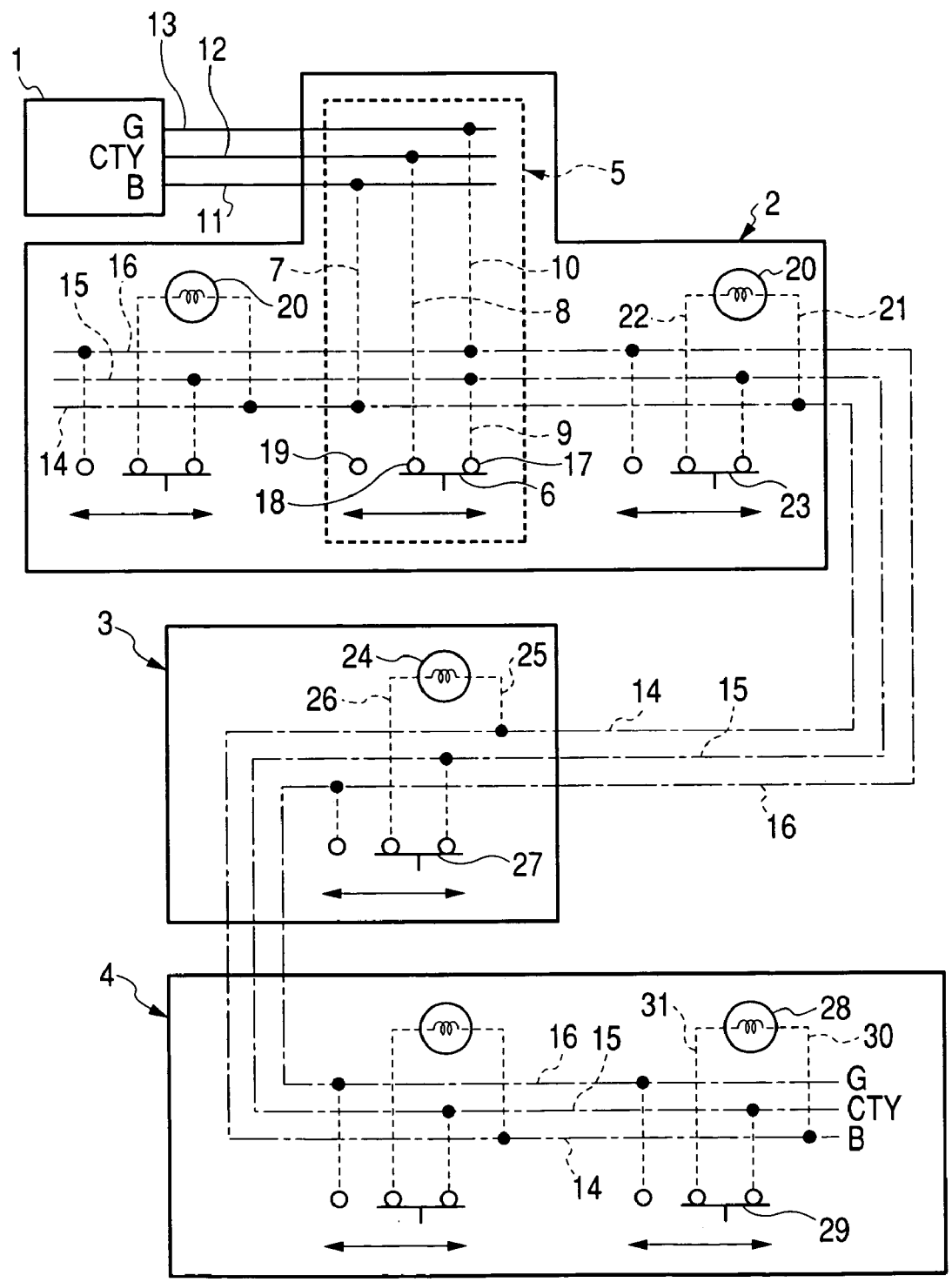
FIG. 1 is a circuit diagram showing a connecting circuit according to a first embodiment of the present invention.

As shown in FIG. 1, a circuit configuration according to a first embodiment comprises a junction box 1, a map lamp (first lamp module) 2, a dome lamp (second lamp module) 3 and a rear reading lamp (third lamp module) 4.

In this embodiment, a junction circuit 5 having a function of a junction connector is provided with the map lamp 2. A cancel switch 6 is provided in this junction circuit 5. In other words, a cancel switch circuit may also have the function of junction circuit. The junction circuit 5 is arranged by four sets of bus bars 7 to 10.

The junction circuit 5 is connected to main circuits 11 to 13, which correspond to main wire harnesses derived from the junction box 1. The main circuits are constituted by three lines of a power supply circuit 11, a courtesy lamp circuit (notification signal circuit) 12, and a grounding circuit 13. The courtesy lamp circuit (will be referred to as "courtesy circuit" hereinafter) 12 corresponds to a circuit for sending ON/OFF signals of a courtesy lamp of a vehicle.

The power supply circuit 11 derived from the junction box 1 is directly connected via the junction circuit 7 to the power supply circuit 14 of the map lamp 2, the courtesy circuit 12 is connected from a junction circuit 8 via both a cancel switch 6 and a short junction circuit 9 to a courtesy circuit (notification signal circuit) 15 of the map lamp 2, and also, the grounding circuit 13 is directly connected to a grounding circuit 16 of the map lamp 2. A right contact 17 of the cancel switch 6 is connected to the short junction circuit 9 for a courtesy purpose; a center contact 18 of this cancel switch 6 is connected to the long junction circuit 8 for a courtesy purpose; and a left contact 19 of this cancel switch 6 constitutes a dead contact which is not connected to any circuit. The respective lamps 2 to 4 can emit light at the same time in response to courtesy signals in an cooperating mode.

When the cancel switch 6 is slid along a left direction in FIG. 1, the courtesy circuit 15 is deactivated, so that the courtesy signal is not transferred to all of these lamps 2 to 4. In other words, the courtesy signal is canceled in all of the lamps 2 to 4, so that none of these lamps 2 to 4 emit light in cooperating manner as courtesy lamps. This is because certain car drivers have such intentions that any of these lamps 2 to 4 are not wanted to be operated in the cooperating mode. It should be understood that all of switches shown in this drawing are such slide switches which are slid along the right/left directions, as indicated by arrows.

While light emitters 20 are arranged in both sides of the cancel switch 6 one by one, one electrode circuit 21 of each of the light emitters 20 is directly connected to the power supply circuit 14 in a series connecting manner, whereas the other electrode circuit 22 is connected via switches 23 to the courtesy circuit 15. When each of the switches 23 is slide-operated along the left direction in this figure, the other electrode circuit 22 of each of the light emitters 20 is connected to the grounding circuit 16, so that the light emitter 20 can emit light irrespective of the cancel switch 6. It is preferable that electrode circuits and connecting circuits, which are indicated by dashed lines in this drawing, are constructed of bus bars.

The three circuits of the map lamp 2, namely, the power supply circuit 14, the courtesy circuit 15, and the grounding circuit 16 are extended via the center dome lamp 3 up to the rear reading lamp 4 by using wiring lines. The circuits shown in these chain lines are operated as sub-wire harnesses, and are preferably constituted by a flat cable.

In the dome lamp 3, one electrode circuit 25 of a light emitter 24 is directly connected to the power supply circuit 14, and the other electrode circuit 26 of this light emitter 24 is connected via a switch 27 to the courtesy circuit 15, so that the light emitter 24 can emit light in response to a courtesy signal in the cooperating manner. When the switch 27 is slid along the left direction in this drawing, the other electrode circuit 26 is connected to the grounding circuit 16, so that the light emitter 24 can emit light irrespective of the cancel switch 6.

Similar to the map lamp 2, the rear reading lamp 4 contains two light emitters 28, and both a circuit arrangement and operations of this rear reading lamp 4 are similar to those of the above-described map lamp 2. In other words, under the connection condition of the switch 29 shown in FIG. 1, the light emitters 28 emits light in the cooperating manner with the courtesy lamp, whereas when a switch 29 is slide in the left direction, the light emitters 28 emits light irrespective of the courtesy lamp (namely, rear reading lamp 4 can be used).

In the first embodiment, since the cancel switch circuit also serves as the junction circuit 5, the conventional junction connector is no longer required, so that the circuit arrangement can be made simple, the space required to distribute the circuit can be reduced, and also, the cooperations between the courtesy lamps and all of the lamps 2 to 4 can be canceled by the cancel switch 6.

Figure 2:
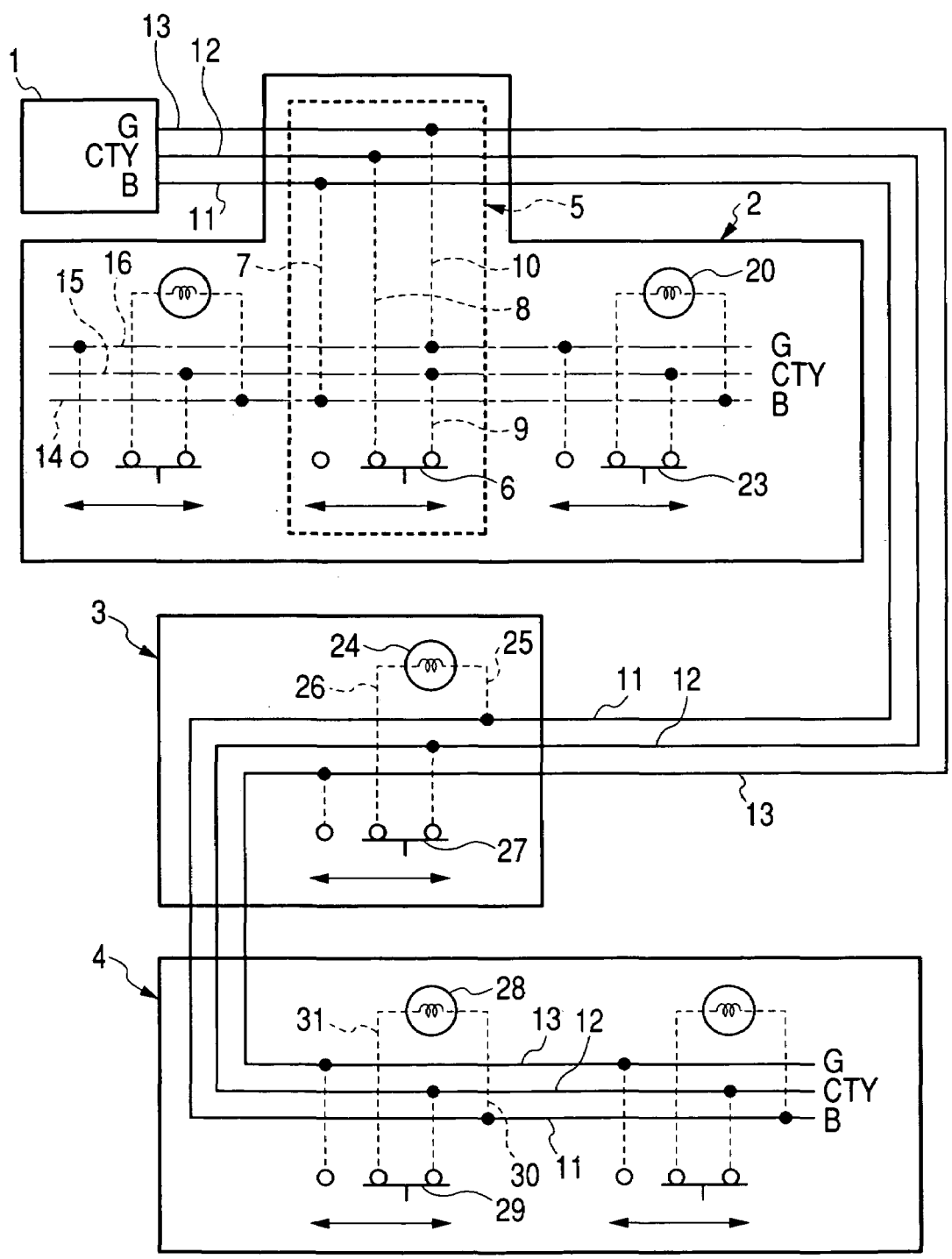
FIG. 2 is a circuit diagram showing a connecting circuit according to a second embodiment of the present invention.

FIG. 2 shows a circuit configuration according to a second embodiment of the invention. Components similar to those in the first embodiment will be designated by the same reference numerals and the repetitive explanation for those will be omitted.

In this embodiment, main circuits 11 to 13 derived from the junction box 1 are connected to a junction circuit (cancel circuit) 5, and also, are connected to the dome lamp 3 and the rear reading lamp 4 in series connection manner, so that only the map lamp 2 is independently operated, and only the cooperation of a courtesy circuit (notification signal circuit) 15 of this map lamp 2 can be canceled.

The three lines of the main circuits (namely, power supply circuit 11, courtesy circuit 12, and grounding circuit 13) are extended up to the rear reading lamp 4 via the dome lamp 2.

That is, as to circuit arraignments in the dome lamp 3 and the rear reading lamp 4, only the sub-circuits 14 to 16 of FIG. 1 are merely changed into the main circuits 11 to 13, and other circuit arrangements thereof are similar to those of FIG. 1.

Since the cancel switch circuit also serves as the junction circuit 5, the conventional junction connector is no longer required, so that the circuit arrangement can be made simple, and the space required to distribute the circuit can be reduced. Since the cancel switch 6 of the map lamp 2 is operated, while only the map lamp 2 is not operated with the courtesy circuit 12 in the cooperating manner, even in such a case that the courtesy signal is activated, the light emitters 20 of the map lamp 2 cannot emit light. Then, other lamps than the map lamp 2, namely, both the dome lamp 3 and the rear reading lamp 4 are always operated with the courtesy circuit 12 in the cooperating manner, so that these dome lamp 3 and rear reading lamp 4 can simultaneously emit light when the courtesy lamp emits light. It is apparent that in both the dome lamp 3 and the rear reading lamp 4, each of the light emitters 24 and 28 can independently emit light by sliding the switch 27 and the switch 29 in the left direction.

Figure 3:
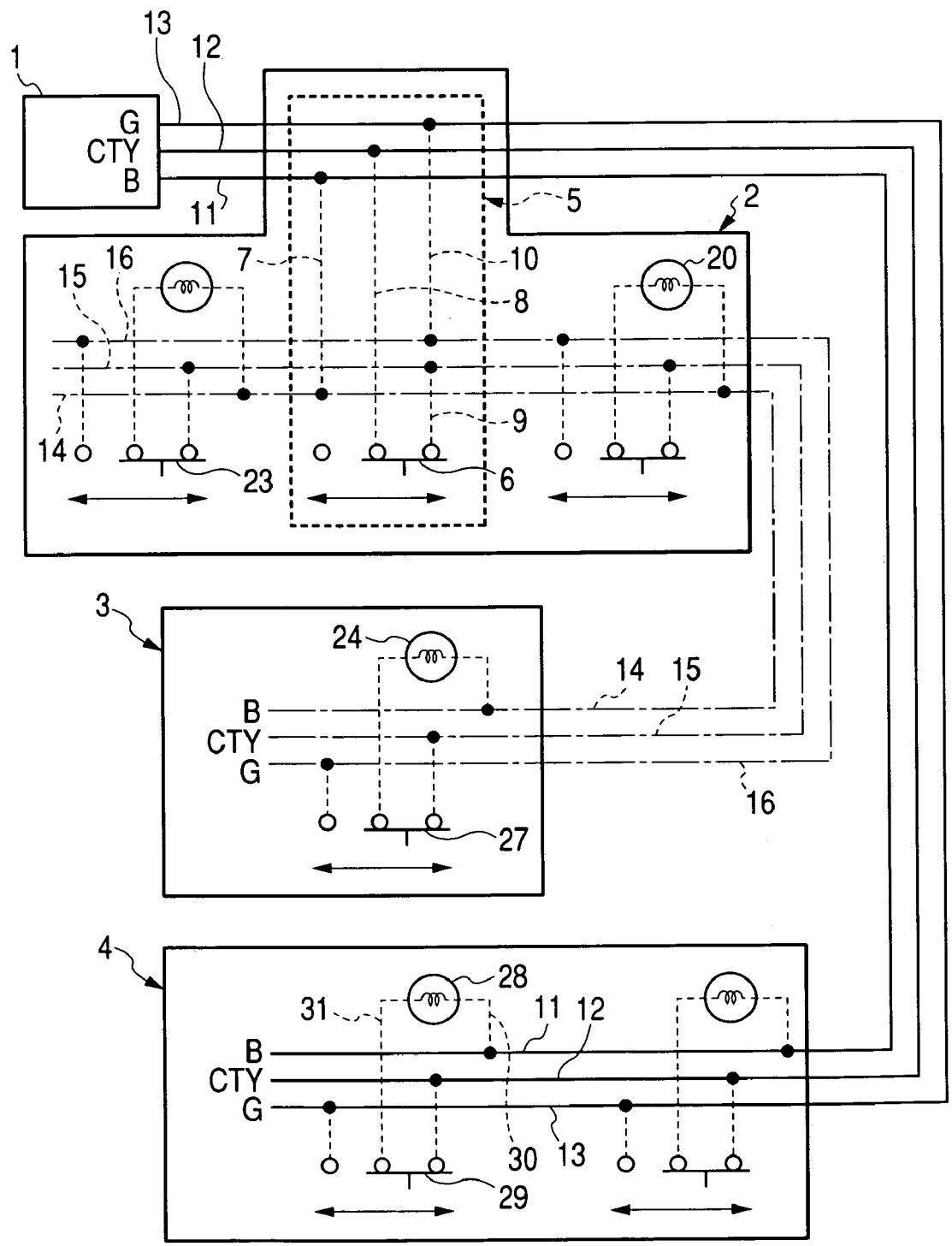
FIG. 3 is a circuit diagram showing a connecting circuit according to a third embodiment of the present invention.

FIG. 3 shows a circuit configuration according to a third embodiment of the invention. Components similar to those in the first embodiment will be designated by the same reference numerals and the repetitive explanation for those will be omitted.

In this embodiment, main circuits 11 to 13 derived from the junction box 1 are connected to a junction circuit (cancel circuit) 5, and also, are connected to the rear reading lamp 4 in series connection manner.

Furthermore, sub-circuits 14 to 16 of the map lamp 2 are extended up to the dome lamp 3 as sub-circuits 14 to 16 of the dome lamp 3, so that the cooperation of a courtesy circuit 15 in the map lamp 2 and the dome lamp 3 can be simultaneously canceled.

Specifically, when a cancel switch 6 of the map lamp 2 is slid to the left in this figure, the courtesy circuit 15 is interrupted, so that both the map lamp 2 and the dome lamp 3 are operated in a non-cooperating manner with respect to the courtesy circuit 12, and thus, even when a courtesy lamp emits light, the respective light emitters 20 and 24 of the map lamp 2 and the dome lamp 3 do not emit light.

Circuit arrangements of both the map lamp 2 and the dome lamp 3 are the same as those shown in the first embodiment. The sub-circuits 14 to 16 continued from the map lamp 2 are terminated in the dome lamp 3, so that the map lamp 2 is not directly connected to the rear reading lamp 4. The main circuits 11 to 13 are directly connected to the rear reading lamp 4.

Therefore, in accordance with the operation of the cancel switch 6, the cooperation of the courtesy circuit 15 in the map lamp 2 and the dome lamp 3 can be canceled while the cooperation of the rear reading lamp 4 is maintained irrespective of the operation of the cancel switch 6.

Figure 4:
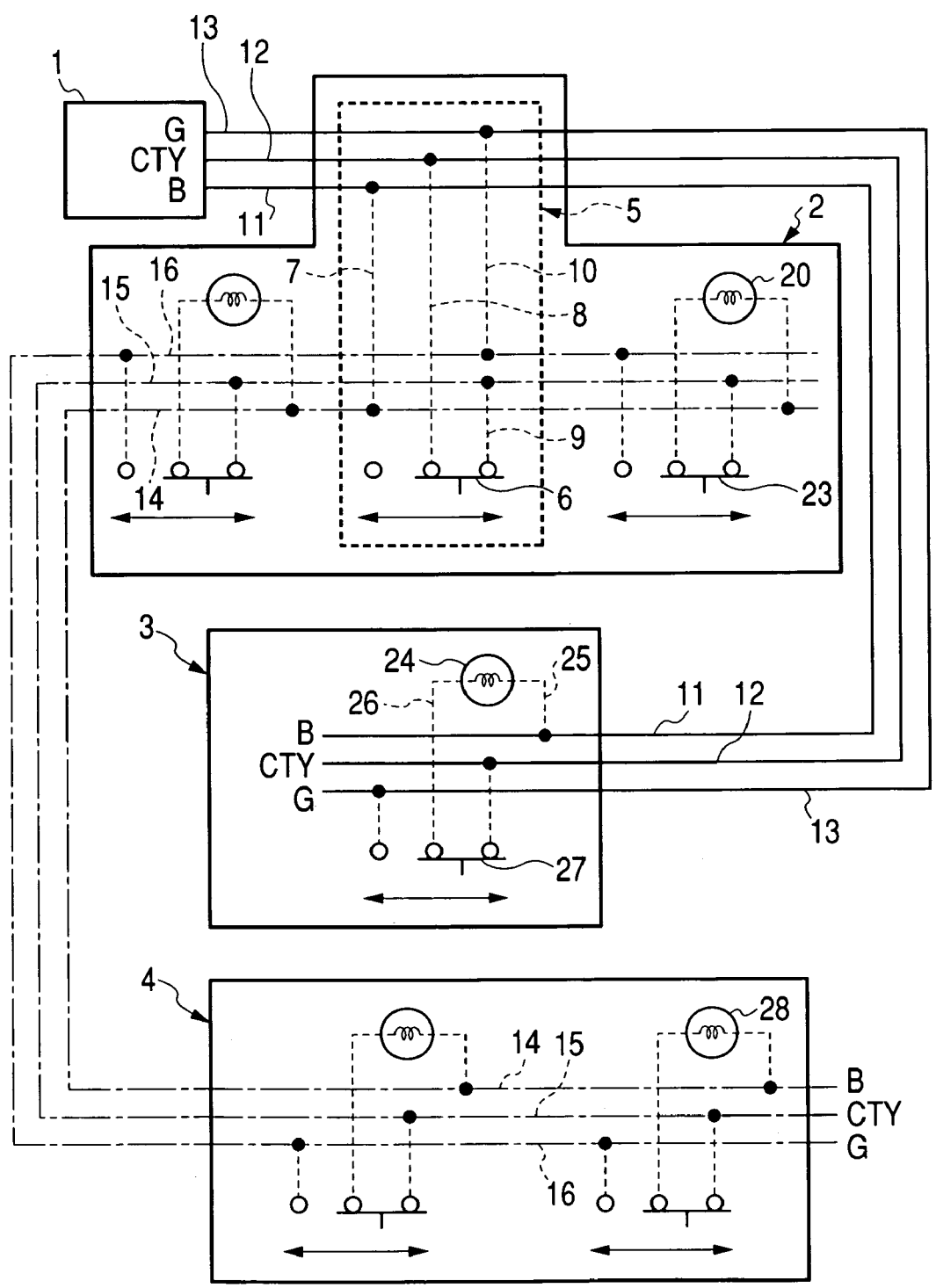
FIG. 4 is a circuit diagram showing a connecting circuit according to a fourth embodiment of the present invention.
Figure 5:
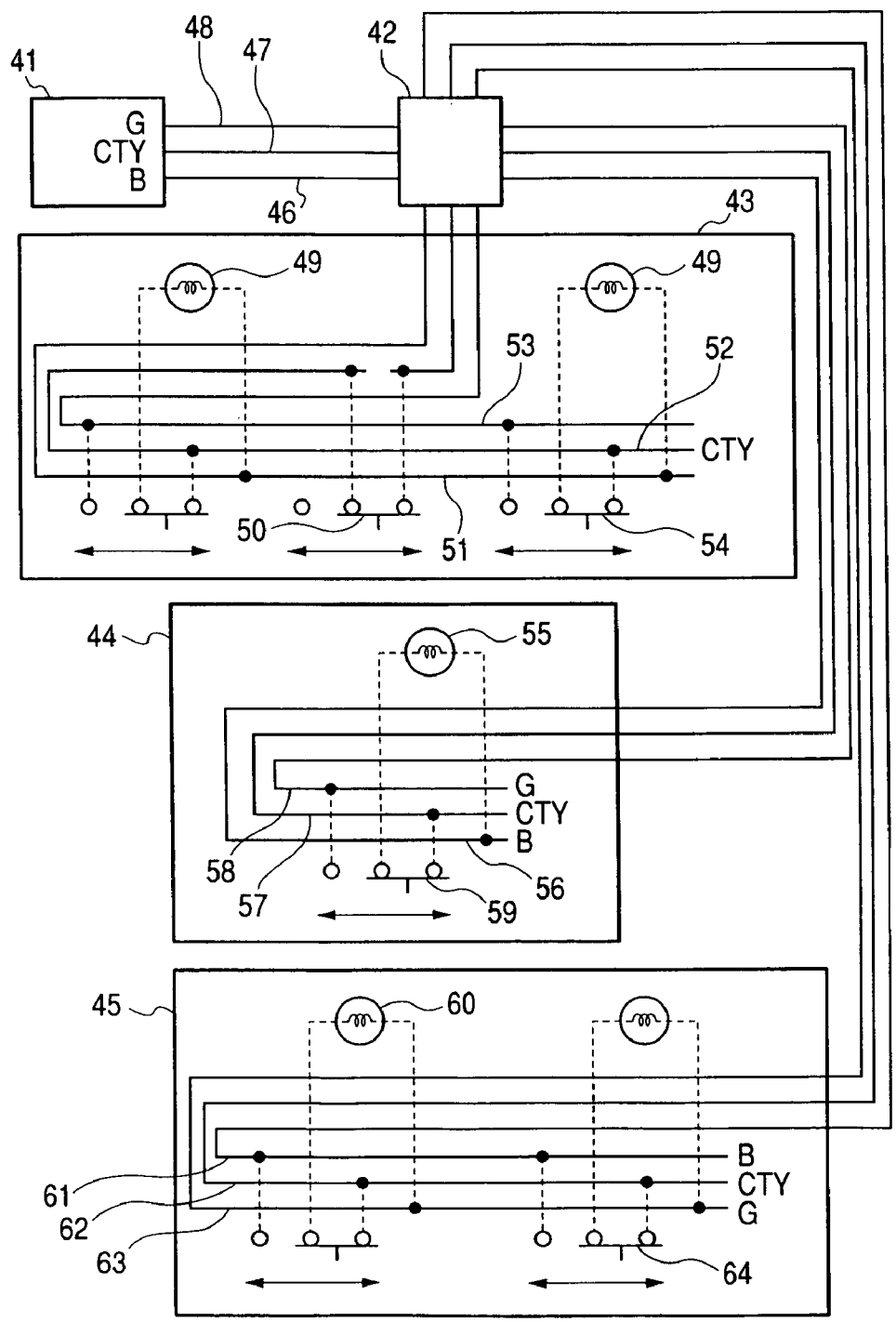
FIG. 5 is a circuit diagram showing a related-art connecting circuit.

FIG. 4 shows a circuit configuration according to a fourth embodiment of the invention. Components similar to those in the first embodiment will be designated by the same reference numerals and the repetitive explanation for those will be omitted.

In this embodiment, main circuits 11 to 13 derived from the junction box 1 are connected to a junction circuit (cancel circuit) 5, and also, are connected to the dome lamp 3 in a series connection manner. Furthermore, sub-circuits 14 to 16 of the map lamp 2 are extended up to the rear reading lamp 4, so that the cooperation of a courtesy circuit 15 in the map lamp 2 and the rear reading lamp 4 can be simultaneously canceled.

Circuit arrangements of both the map lamp 2 and the rear reading lamp 4 are the same as those in the first embodiment. The sub-circuits 14 to 16 continued from the map lamp 2 are terminated in the rear reading lamp 4, so that the map lamp 2 is not directly connected to the dome lamp 3. The main circuits 11 to 13 are directly connected to the dome lamp 3.

Therefore, in accordance with the operation of the cancel switch 6, the cooperation of the courtesy circuit 15 in the map lamp 2 and the rear reading lamp 4 can be canceled while the cooperation of the dome lamp 3 is maintained irrespective of the operation of the cancel switch 6.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

For example, the light emitters 20, 24, 28 may be filament type bulbs, LEDs of electronic elements, or the like. Bus bars and wire harnesses may be selectively used in any of the circuits in accordance with the required circuit configuration. The respective switch is not limited to the above-described slide switch.

The respective lamp modules are not limited to the modules designed for ceiling lamps of the vehicle, but may be realized by employing lamps mounted around an instrument panel of the vehicle, and other sorts of lamps. Instead of the courtesy circuit 12, there may be adopted other notification signal circuits for indicating the condition of the window or the tire pressure, for example.

Regarding the first and the second embodiments, the rear reading lamp may be omitted.

What is claimed is:

1. A circuit configuration provided in a vehicle, comprising:
    an electric junction box;
    a first circuit, directly connected to the electric junction box to supply a notification signal indicating a condition of a part of the vehicle;
    a second circuit, adapted to transmit the notification signal;
    a first lamp module, disposed at a first part of the vehicle, comprising:
        a switch; and
        a junction circuit, at which the first circuit and the second circuit are connected or disconnected in accordance with a state of the switch; and
    a second lamp module, disposed at a second part of the vehicle and connected to the first lamp module via the second circuit,
    wherein a light emitter which emits light when the notification signal is supplied thereto is provided in each of the first lamp module and the second lamp module.

2. The circuit configuration as set forth in claim 1, further comprising a third lamp module, disposed at a third part of the vehicle and connected to the first lamp module via the second circuit,
    wherein a light emitter which emits light when the notification signal is supplied thereto is provided in the third lamp module.

3. The circuit configuration as set forth in claim 1, further comprising a third lamp module, disposed at a third part of the vehicle and connected to the first lamp module via the first circuit,
    wherein a light emitter which emits light when the notification signal is supplied thereto is provided in the third lamp module.

4. The circuit configuration as set forth in claim 2, wherein:
    the first lamp module is a map lamp module;
    one of the second lamp module and the third lamp module is a dome lamp module;
    the other one of the second lamp module and the third lamp module is a rear reading lamp module; and
    the notification signal indicates whether a courtesy lamp is activated.

5. The circuit configuration as set forth in claim 3, wherein:
    the first lamp module is a map lamp module;
    one of the second lamp module and the third lamp module is a dome lamp module;
    the other one of the second lamp module and the third lamp module is a rear reading lamp module; and
    the notification signal indicates whether a courtesy lamp is activated.

6. A circuit configuration provided in a vehicle, comprising:
    an electric junction box;
    a first circuit, directly connected to the electric junction box to supply a notification signal indicating a condition of a part of the vehicle;
    a second circuit, adapted to transmit the notification signal;
    a first lamp module, disposed at a first part of the vehicle, comprising:
        a switch; and
        a junction circuit, at which the first circuit and the second circuit are connected or disconnected in accordance with a state of the switch; and
    a second lamp module, disposed at a second part of the vehicle and connected to the electric junction box via the first circuit,
    wherein a light emitter which emits light when the notification signal is supplied thereto is provided in each of the first lamp module and the second lamp module.

7. The circuit configuration as set forth in claim 6, further comprising a third lamp module, disposed at a third part of the vehicle and connected to the electric junction box via the first circuit,
    wherein a light emitter which emits light when the notification signal is supplied thereto is provided in the third lamp module.

8. The circuit configuration as set forth in claim 7, wherein:
    the first lamp module is a map lamp module;
    one of the second lamp module and the third lamp module is a dome lamp module;
    the other one of the second lamp module and the third lamp module is a rear reading lamp module; and
    the notification signal indicates whether a courtesy lamp is activated.

* * * * *